US010484454B2

(12) United States Patent
Almalki et al.

(10) Patent No.: US 10,484,454 B2
(45) Date of Patent: Nov. 19, 2019

(54) ELECTRONIC DEVICE AND METHOD OF PROVIDING DIGITAL PHOTOGRAPH INFORMATION

(71) Applicant: BLACKBERRY LIMITED, Waterloo (CA)

(72) Inventors: Nazih Almalki, Waterloo (CA); Zhe Chen, Kitchener (CA)

(73) Assignee: BlackBerry Limited, Waterloo (CA)

( * ) Notice: Subject to any disclaimer, the term of this patent is extended or adjusted under 35 U.S.C. 154(b) by 186 days.

(21) Appl. No.: 14/855,632

(22) Filed: Sep. 16, 2015

(65) Prior Publication Data

US 2017/0078363 A1 Mar. 16, 2017

(51) Int. Cl.
| | |
|---|---|
| *G06F 16/00* | (2019.01) |
| *H04L 29/08* | (2006.01) |
| *H04N 5/77* | (2006.01) |
| *H04N 5/907* | (2006.01) |
| *G06F 3/0484* | (2013.01) |
| *G06F 3/0488* | (2013.01) |
| *H04L 12/58* | (2006.01) |
| *G06F 16/51* | (2019.01) |
| *G06F 16/58* | (2019.01) |
| *G06F 16/583* | (2019.01) |

(52) U.S. Cl.
CPC ............ *H04L 67/06* (2013.01); *G06F 3/0488* (2013.01); *G06F 3/04842* (2013.01); *G06F 16/51* (2019.01); *G06F 16/5846* (2019.01); *G06F 16/5866* (2019.01); *H04L 51/08* (2013.01); *H04L 51/32* (2013.01); *H04N 5/772* (2013.01); *H04N 5/907* (2013.01)

(58) Field of Classification Search
None
See application file for complete search history.

(56) References Cited

U.S. PATENT DOCUMENTS 6,931,407 B1 *   8/2005   Brown ................... G06F 16/93
7,831,598 B2 * 11/2010   Ko ..................... G06F 17/30265
                                                                707/736

(Continued)

FOREIGN PATENT DOCUMENTS

WO        2007149609 A2     12/2007

OTHER PUBLICATIONS

European Patent Application No. EP16186824.5, Extended European Search Report dated Jan. 31, 2017.

(Continued)

*Primary Examiner* — Bai D Vu
(74) *Attorney, Agent, or Firm* — Borden Ladner Gervais LLP; Todd Keeler

(57) ABSTRACT

A method of providing information relating to a digital photograph on an electronic device includes detecting, by a processor of the electronic device, a digital photograph sharing event for sharing the digital photograph, receiving text input related to the digital photograph, the text input comprising text entered at the electronic device or text received from the at least one other electronic device, in response to detecting and receiving text input related to the digital photograph, processing the text related to the digital photograph utilizing natural language processing to extract the information relating to the digital photograph, and storing the information that is extracted in association with the digital photograph.

14 Claims, 4 Drawing Sheets

(56) References Cited

U.S. PATENT DOCUMENTS

| | | |
|---|---|---|
| 8,520,909 B2 | 8/2013 | Leung et al. |
| 2003/0041111 A1* | 2/2003 | Delaney .............. G06Q 10/107 709/206 |
| 2004/0044894 A1* | 3/2004 | Lofgren ................ G06T 1/0028 713/176 |
| 2006/0239646 A1* | 10/2006 | Kang ...................... H04N 7/163 386/213 |
| 2010/0082624 A1 | 4/2010 | Martin et al. |
| 2010/0333194 A1* | 12/2010 | Ricordi ............. G06F 17/30943 726/17 |
| 2012/0179676 A1* | 7/2012 | Park .................. G06F 17/30268 707/736 |
| 2012/0231774 A1* | 9/2012 | Blades ................... G06F 17/214 455/414.4 |
| 2012/0265528 A1* | 10/2012 | Gruber .................... G10L 15/18 704/235 |
| 2013/0024805 A1* | 1/2013 | In .......................... G11B 27/34 715/781 |
| 2013/0311470 A1* | 11/2013 | Lotfi ................. G06F 17/30705 707/737 |

OTHER PUBLICATIONS

European Patent Application No. 16186824.5, Office Action dated Sep. 7, 2018.
European Patent Application No. EP16186824.5, Summons to Attend Oral proceedings dated Jun. 12, 2019.

* cited by examiner

ELECTRONIC DEVICE AND METHOD OF PROVIDING DIGITAL PHOTOGRAPH INFORMATION

FIELD OF TECHNOLOGY

The present disclosure relates to the storage of digital photographs on electronic devices.

BACKGROUND

Electronic devices, including portable electronic device, have gained widespread use and may provide a variety of functions including, for example, telephonic, electronic messaging and other personal information manager (PIM) application functions, and digital photograph storage.

With the use of electronic devices to capture and store digital photographs, the number of such digital photographs captured and stored on an electronic device may be very large. With the ever-increasing number of digital photographs being stored, the organization of such storage and the ability to search through large numbers of digital images is desirable.

Improvements in storage of digital photographs on electronic devices are desirable.

BRIEF DESCRIPTION OF THE DRAWINGS

Embodiments of the present disclosure will now be described, by way of example only, with reference to the attached figures, in which.

DETAILED DESCRIPTION

Figure 1:
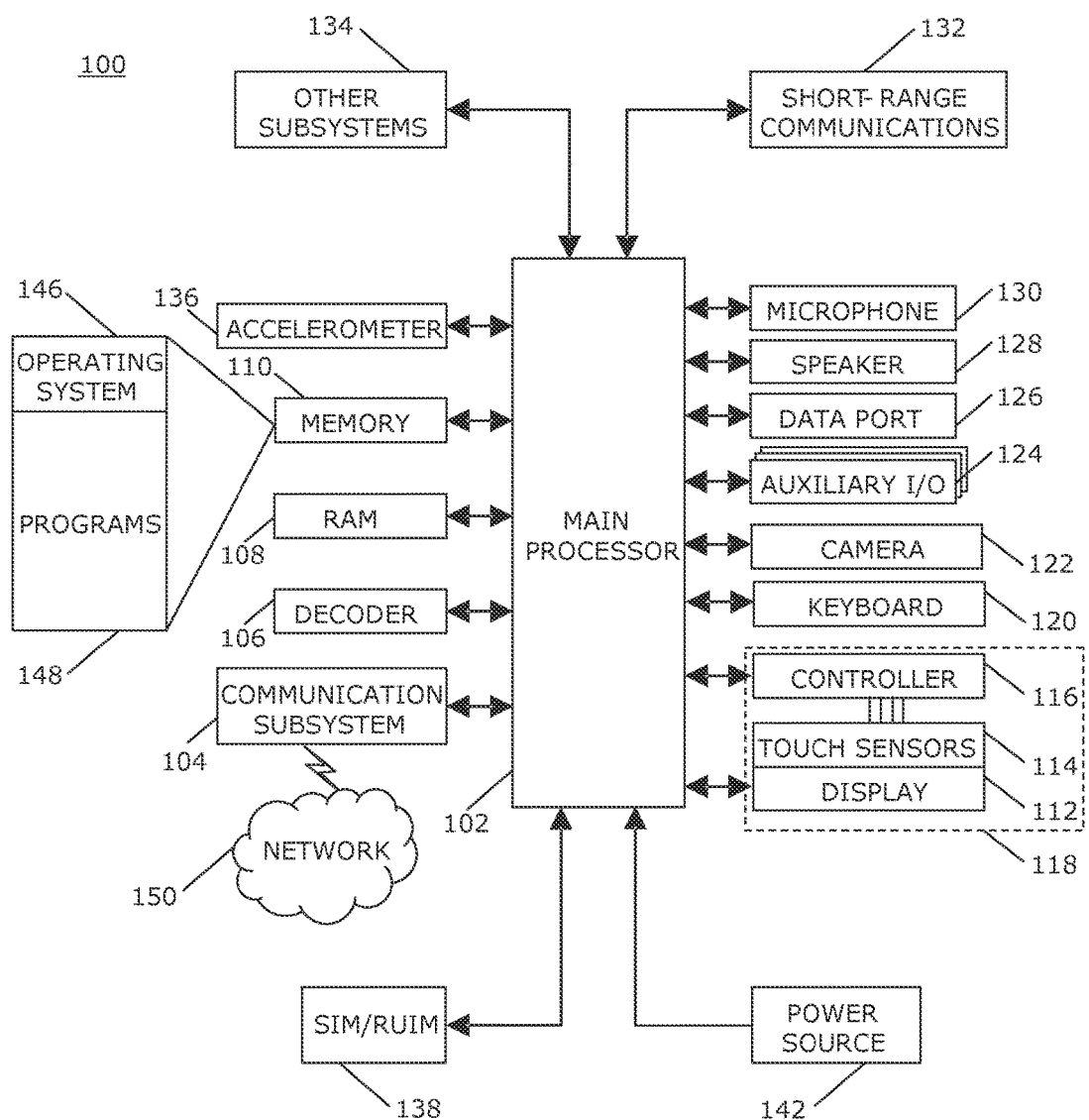
FIG. 1 is a block diagram of a portable electronic device in accordance with the present disclosure.

The following generally describes an electronic device and a method of providing information relating to a digital photograph on the electronic device. The method includes detecting, by a processor of the electronic device, a digital photograph sharing event for sharing the digital photograph, receiving text input related to the digital photograph, the text input comprising text entered at the electronic device or text received from the at least one other electronic device, in response to detecting and receiving text input related to the digital photograph, processing the text related to the digital photograph utilizing natural language processing to extract the information relating to the digital photograph, and storing the information that is extracted in association with the digital photograph.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a keyboard or a portable electronic device as described herein. Examples of portable electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, a camera 122, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use. The keyboard 120 may be utilized for entry of characters such as alphabetical characters, numeric characters, punctuation, or symbols.

The touch-sensitive display 118 includes a display 112 and touch sensors 114 that are coupled to at least one controller 116 that is utilized to interact with the processor 102. Input via a graphical user interface is provided via the touch-sensitive display 118 and the keyboard 120. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110, Additional applications or programs may be loaded onto the electronic device 100 through the wireless network 150, the auxiliary I/O subsystem 124, the data port 126, the short-range communications subsystem 132, or any other suitable subsystem 134.

The camera 122 includes an image capturing system and may include a flash output arrangement, The image capturing system includes a number of components including an optical system of lenses, an image sensor; a controller and an image processor. Software for controlling the camera 122 resides on the portable electronic device 100, for example, in the memory 110. By, for example, selecting an icon displayed on the touch-sensitive display 118, the camera 122 is turned on as the camera application is launched. The camera 122 is employed for capturing still images, referred to as electronic photographs, by, for example, pressing a virtual button on the touch-sensitive display 118. The camera 122 may also be utilized for capturing video images. When a digital photograph is taken, the image may be displayed on the touch-sensitive display 118 and the digital photograph may be saved as a digital photograph file in a digital photograph database resident on the portable electronic device 100, for example, in the memory 110.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern, The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact, The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

Figure 2:
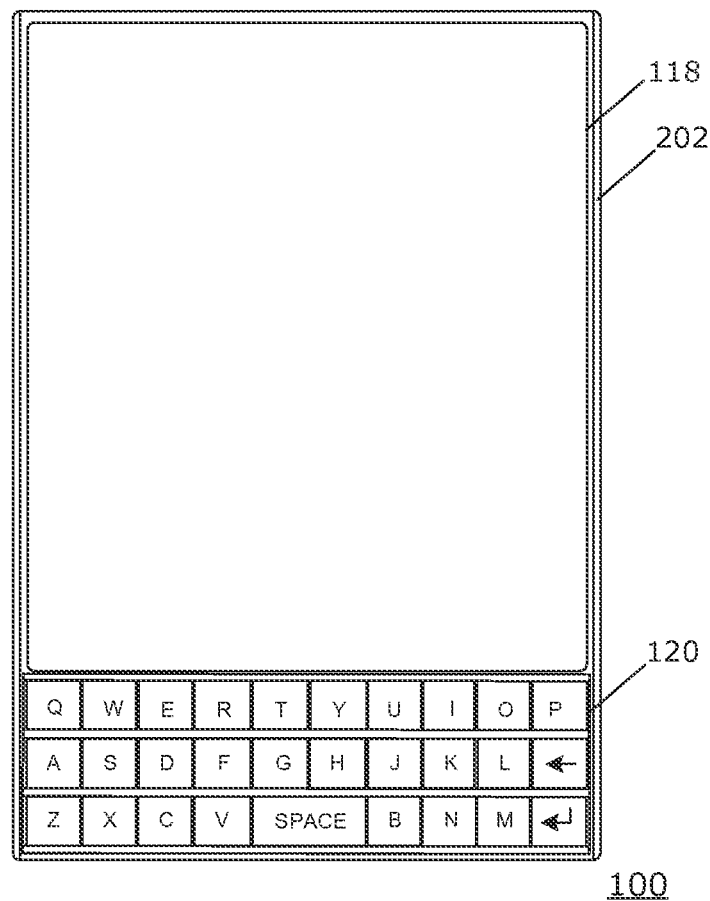
FIG. 2 is a front view of an example of a portable electronic device in accordance with the disclosure.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area, An example of an electronic device 100 is shown in FIG. 2. In the example of FIG. 2, the electronic device 100 includes a housing 202 in which the touch-sensitive display 118 is disposed. The housing 202 is utilized to enclose components such as the components shown in FIG. 1. The keyboard 120 is adjacent to the touch-sensitive display 118 in the example illustrated in FIG. 2. The keyboard 120 includes a plurality of keys for entry of characters into fields of documents, messages, websites, and so forth, which are displayed utilizing the touch-sensitive display 118.

Figure 3:
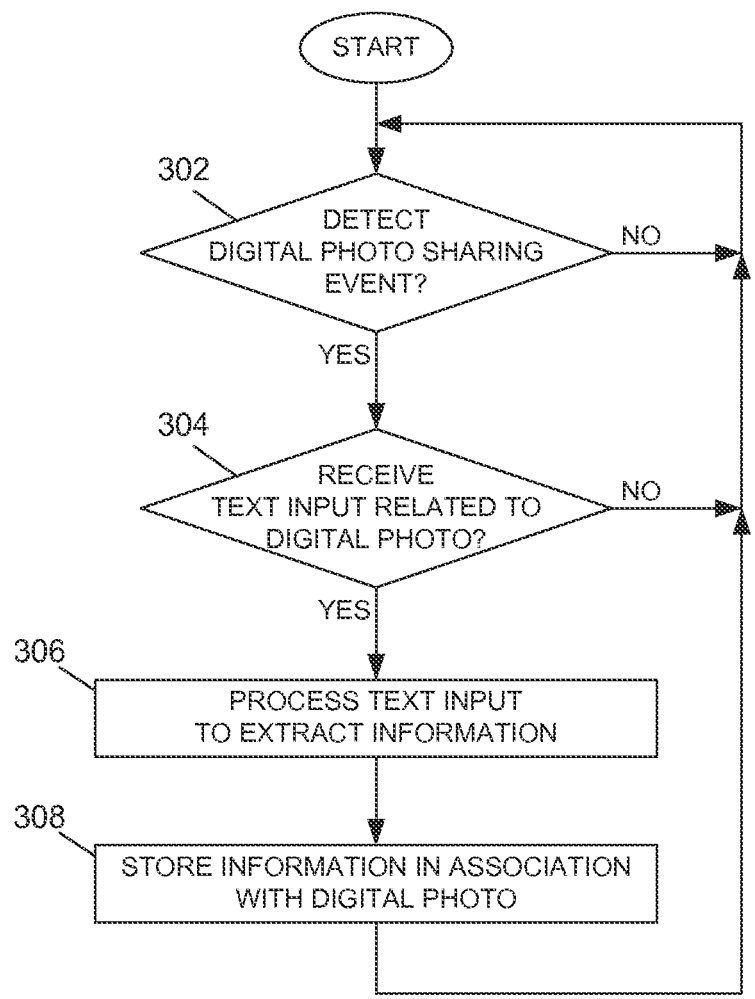
FIG. 3 is flowchart illustrating a method of providing information relating to a digital photograph.

A flowchart illustrating a method of providing information relating to a digital photograph is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by a processor 102 of the portable electronic device 100 to perform the method may be stored in a computer-readable storage medium, such as a non-transitory computer-readable medium.

In response to detecting a digital photograph sharing event for sharing a digital photograph at 302, the process continues at 304. The digital photograph sharing event may be any suitable event in which a digital photograph stored on the electronic device 100 is shared or in which a digital photograph is shared with the electronic device 100. A digital photograph stored on the electronic device 100 may be stored in RAM 108 or in a digital photograph database stored on the persistent, updatable memory 108. The digital photograph may be shared, for example, by attaching the digital photograph to a message such as an instant message, an email message, or any other suitable messaging service.

Thus, the digital photograph sharing event may be detected when selection of an option to attach the digital photograph to a message is received at the processor 102. The digital photograph may also be shared by uploading the digital photograph to a website such as a social media website or a file sharing website or external storage. Thus, the digital photograph sharing event may be detected when an option to upload the digital photograph to a website is received at the processor 102. The digital photograph sharing event may also be detected when a comment relating to the digital photograph is received via a website such as a social media website or a file sharing website.

In addition to detecting a sharing event in which a digital photograph stored on the electronic device 100 is shared, a sharing event may be detected when a digital photograph is received at the electronic device 100, for example, a digital photograph downloaded from a website and saved in memory 110 at the electronic device 100 or a digital photograph attached to a message received at the electronic device 100. The sharing event may be detected by detecting receipt of selection of an option to save the digital photograph to the electronic device 100.

In response to detecting receipt of text input related to the digital photograph at 304, the process continues at 306. The text input may be received from text that is entered utilizing the keyboard 120 of the electronic device or may be information such as text that is received from another electronic device or website. For example, the text may be text from a subject field or a body of a message to which the digital photograph is attached. The text input may also be text input such as a title or other text accompanying a digital photograph that is uploaded to a social media website or file sharing website. The text input may also be text received in a reply message to a previously sent message to which a digital photograph was attached, or may be a tag or text received in a comment related to a digital photograph previously uploaded to a social media sharing website. Thus, the electronic device 100 determines that text in messaging service or from a social media sharing website is related to a previously uploaded photograph. The text input may also be audible input such as a voice note that is translated to text. Thus, the electronic device 100 continually monitors for input relating to the digital photograph by identifying input in response detecting a digital photograph sharing event.

In response to receiving the text input at 304, the text input is processed to extract information at 306. The text input is processed utilizing natural language processing to extract information relating to the digital photograph. The information extracted may include any suitable information, such as a subject, a category, a location name, event name, a date, names of people, activities, and any other suitable information.

The information extracted at 306 is then stored in association with the digital photograph at 308. The information is stored by writing the extracted information into a digital photograph file stored on the electronic device as tags, thereby adding to metadata already stored in association with the digital photograph. Because the information is stored as a tag or tags, the information may be browsed or searched.

The information that is stored in association with the digital photograph may be searchable, for example, by a search function in which a string is entered utilizing the keyboard 120, to identify digital photographs that include a tag that at least partially matches the entered string. Alternatively or in addition, the information that is stored in association with the digital photograph may be automatically searched by the electronic device to identify digital photographs that include a tag or tags related to information displayed on the display 122 of the electronic device 100, which may be information entered in any suitable application utilizing the keyboard 120 or may be information displayed on the display 112.

Figure 4:
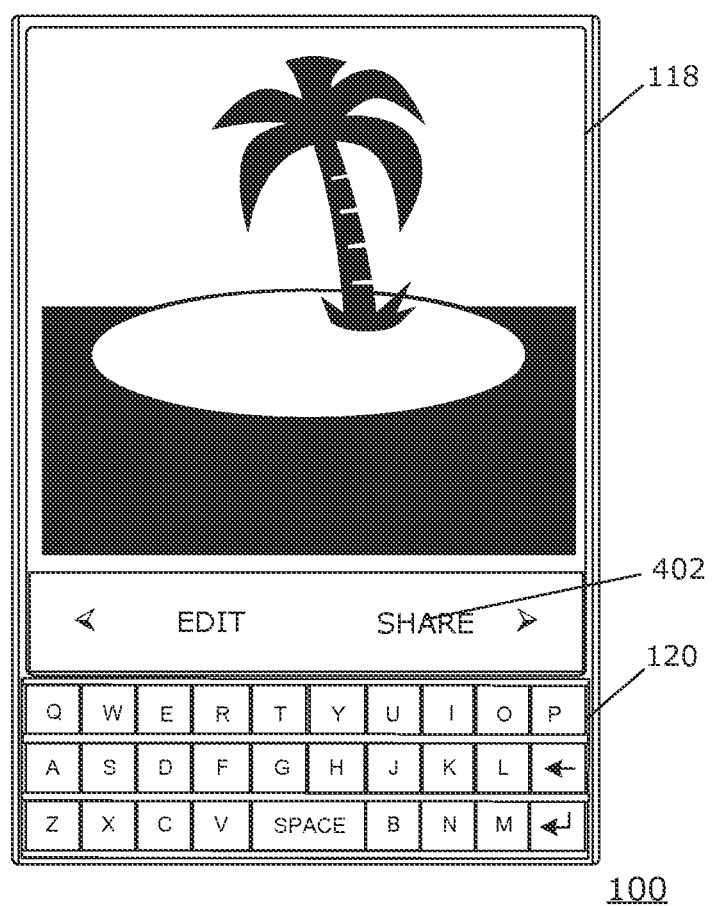
FIG. 4 is a front view of an example of the portable electronic device of FIG. 2.

Continued reference is made to FIG. 3 with additional reference to FIG. 4 to describe an example of a method of providing information relating to a digital photograph.

For the purposes of the example of FIG. 4, a digital photograph is displayed on the portable electronic device 100. The digital photograph may be viewed in response to receipt of a selection of a thumbnail image of a digital photograph stored in a digital photograph database on the portable electronic device 100, Selectable options, including an option 402 to share the digital photograph are also displayed. In the present example, the option to share the digital photograph is selectable upon receipt of a touch at a location associated with the option on the touch-sensitive display 118. In response to receipt of selection of the option 402 to share, the electronic device 100 detects the digital photograph sharing event at 302.

An option to upload the digital photograph to a social media website is displayed and selection of the option to upload the digital photograph to the social media website is received at 304. For the purposes of this example, the keyboard 120 is utilized to type "pic of the beach from my vacation" to accompany the digital photograph uploaded to the social media website. The portable electronic device 100 detects the text input related to the digital photograph at 304 and processes the text input at 306. The terms "beach" and "vacation" are extracted utilizing natural language processing at 306 and the extracted terms are stored by adding tags to the digital photograph file stored in the database on the portable electronic device 100 at 308.

A general search for files utilizing the term "vacation" results in the display of a thumbnail image of the digital photograph in the search results. Thus, the extracted terms that are stored in relation to the digital files are searchable to identify related photographs.

According to another example, a digital photograph of a child is taken by a parent utilizing a camera application on the portable electronic device 100. The digital photograph is viewed in response to receipt of a selection of a thumbnail image of a digital photograph stored in a digital photograph database on the electronic device 100. Selectable options, including an option to share the digital photograph are also displayed. In response to receipt of selection of the option to share, the electronic device 100 detects the digital photograph sharing event at 302.

An option to attach the digital photograph to an email message is displayed and selection of the option to attach the digital photograph to an email message is received at 304. For the purposes of this example, the text "My baby Lucy is learning to walk" is added to subject line of the email message. The portable electronic device 100 detects the text input related to the digital photograph at 304 and processes the text input at 306. The terms "Lucy", "baby" and "walk" are extracted utilizing natural language processing at 306 and the extracted terms are stored by adding tags to the digital photograph file stored in the database on the portable electronic device 100 at 308.

According to another example, a digital photograph of food is taken utilizing a camera application on the portable electronic device 100. The digital photograph is viewed in response to receipt of a selection of a thumbnail image of a digital photograph stored in a digital photograph database on the electronic device 100. Selectable options, including an option to share the digital photograph are also displayed. In response to receipt of selection of the option to share, the electronic device 100 detects the digital photograph sharing event at 302.

An option to attach the digital photograph to an MMS (Multimedia Messaging Service) message is displayed and selection of the option to attach the digital photograph to the MMS message is received at 304. For the purposes of this example, the text "Check out the burrito I had a Taco Farm" is added to content of the MMS message. The portable electronic device 100 detects the text input related to the digital photograph at 304 and processes the text input at 306. The term "burrito" is extracted utilizing natural language processing at 306 and the extracted term is stored by adding tags to the digital photograph file stored in the database on the portable electronic device 100. The term "food" may also be extracted based on the text "burrito". Thus, the portable electronic device 100 identifies a category of one or more of the terms that are identified by natural language processing. Thus, a related category may be identified, in addition to identifying specific terms in the text of the message, and the category is added by adding a tag to the digital photograph file at 308.

According to still another example, a digital photograph is received at an electronic device, such as the portable electronic device 100. The digital photograph is received as an attachment to a message, such as an email message. In response to receipt of selection of the option to save the digital photograph, the electronic device 100 detects the digital photograph sharing event at 302 and the digital photograph is stored in a digital photograph database on the electronic device 100.

For the purposes of this example, the digital photograph is a digital image of a dog accompanied by the message "this is my new puppy". The portable electronic device 100 detects the text input received in relation to the digital photograph at 304 and processes the text at 306. The term "puppy" is extracted utilizing natural language processing at 306 and the extracted term is stored by adding a tag to the digital photograph file stored in the database on the portable electronic device 100 at 308. The term "dog" may also be extracted based on the text "puppy" by identifying terms that are related to words or terms utilized in the message, and a tag "dog" may be added to the digital photograph file.

Advantageously, a tag or tags may be automatically stored in association with digital photographs based on text input in relation to the digital photograph, facilitating searching for digital photographs stored on the portable electronic device.

The scope of the claims should not be limited by the preferred embodiments set forth in the examples, but should be given the broadest interpretation consistent with the description as a whole.

What is claimed is:

1. A method of providing information relating to a digital photograph on an electronic device, the method comprising:
    detecting, by a processor of the electronic device, a digital photograph sharing event for sharing the digital photograph, the sharing event comprising attaching the digital photograph to a message;
    in response to detecting a digital photograph sharing event, monitoring for text input in a message field related to the digital photograph sharing event and receiving, by the processor, the text input related to the digital photograph sharing event, the text input comprising text entered, utilizing an input device coupled to the processor of the electronic device, into the message field of the message to which the digital photograph is attached;
    in response to detecting and receiving text input related to the digital photograph sharing event, extracting, by the processor, the information relating to the digital photograph from the text related to the digital photograph utilizing natural language processing;
    storing the information that is extracted in association with the digital photograph by writing the extracted information as tags, into a digital photograph file stored in memory of the electronic device coupled to the processor, wherein the information that is extracted and stored in association with the digital photograph is searchable; and
    receiving a search term, and in response to determining a match between the search term and the information that is extracted and stored in associated with the digital photograph, displaying a thumbnail image of the digital photograph on a display of the electronic device.

2. The method according to claim 1, wherein the storing the information that is extracted comprises storing the information along with other metadata, into the digital photograph file stored on the electronic device.

3. The method according to claim 1, wherein detecting the digital photograph sharing event comprises detecting selection of an option to attach the digital photograph to a message in a messaging application.

4. The method according to claim 1, wherein detecting the digital photograph sharing event comprises detecting selection of an option to upload the digital photograph to a social media website or file sharing website.

5. The method according to claim 1, wherein detecting the digital photograph sharing event comprises detecting receipt of a comment related to the digital photograph via a social media website or messaging application.

6. The method according to claim 1, wherein detecting the digital photograph sharing event comprises detecting selection of an option to download the digital photograph for storage on the electronic device.

7. A non-transitory computer-readable medium having computer-readable code stored thereon, the computer-readable code executable by at least one processor of a portable electronic device to perform the method according to claim 1.

8. An electronic device comprising:
    a display;
    a memory for storing digital photographs in a database thereon;
    an input device for receiving input at the electronic device;
    a communication system for coupling the electronic device to a network; and
    a processor coupled to the display, the memory, the input device, and to the communication system to:
        detect a digital photograph sharing event for sharing a digital photograph of the digital photographs, the sharing event comprising attaching the digital photograph to a message;
        in response to detecting a digital photograph sharing event, monitor for text input in a message field related to the digital photograph sharing event and receive, by the processor, text input related to the digital photograph sharing event, the text input comprising text, entered utilizing the input device coupled to the processor of the electronic device, in the message field of the message to which the digital photograph is attached;

in response to detecting and receiving the text input related to the digital photograph sharing event, extract, by the processor, the information relating to the digital photograph from the text related to the digital photograph utilizing natural language processing;

store the information that is extracted in association with the digital photograph by writing the extracted information as tags, into a digital photograph file stored in the memory, wherein the information that is extracted and stored in association with the digital photograph is searchable; and receive a search term, and in response to determining a match between the search term and the information that is extracted and stored in associated with the digital photograph, display a thumbnail image of the digital photograph on a display of the electronic device.

9. The electronic device according to claim 8, wherein the information is stored along with other metadata, in the digital photograph file stored in the database.

10. The electronic device according to claim 8, wherein the digital photograph sharing event is detected by detecting selection of an option to attach the digital photograph to a message in a messaging application.

11. The electronic device according to claim 8, wherein the digital photograph sharing event is detected by detecting selection of an option to upload the digital photograph to a social media website or file sharing website.

12. The electronic device according to claim 8, wherein the digital photograph sharing event is detected by detecting receipt of a comment related to the digital photograph via a social media website or messaging application.

13. The electronic device according to claim 8, wherein the digital photograph sharing event is detected by detecting selection of an option to download the digital photograph for storage on the electronic device.

14. The electronic device according to claim 8, comprising a camera coupled to the processor for obtaining the digital photographs.

* * * * *